(No Model.)

J. K. TULLIS.
LINK DRIVING BELT.

No. 372,880. Patented Nov. 8, 1887.

WITNESSES:
J. H. Clark
C. Sedgwick

INVENTOR:
J. K. Tullis
BY Munn & Co.
ATTORNEYS.

UNITED STATES PATENT OFFICE.

JOHN KEIL TULLIS, OF GLASGOW, COUNTY OF LANARK, SCOTLAND.

LINK DRIVING-BELT.

SPECIFICATION forming part of Letters Patent No. 372,880, dated November 8, 1887.

Application filed July 30, 1887. Serial No. 245,712. (No model.) Patented in England November 26, 1884, No. 15,563.

*To all whom it may concern:*

Be it known that I, JOHN KEIL TULLIS, of the firm of JOHN TULLIS & SON, St. Ann's Leather Works, Glasgow, in the county of Lanark, North Britain, leather-belt manufacturer, have invented Improvements in the Construction of Link Driving-Belts, (for which I received Letters Patent in England, No. 15,563, dated November 26, 1884;) and I do declare that the following is a full, clear, and exact description of the invention, which will enable others skilled in the art to which it appertains to make and use the same.

My invention, which relates to the construction of link driving-belts, has for its object to enable such belts to lie in close contact with the rounded surface of the driving-pulleys on which such belts run. This object is effected by forming the leather links of a gradually-increasing depth from the center toward the edges, thus constituting the driving-surface of the belt into a rounded hollow channel.

In order that my said invention may be properly understood and readily carried into effect, I will now proceed to describe the drawings hereunto annexed.

Figure 1:
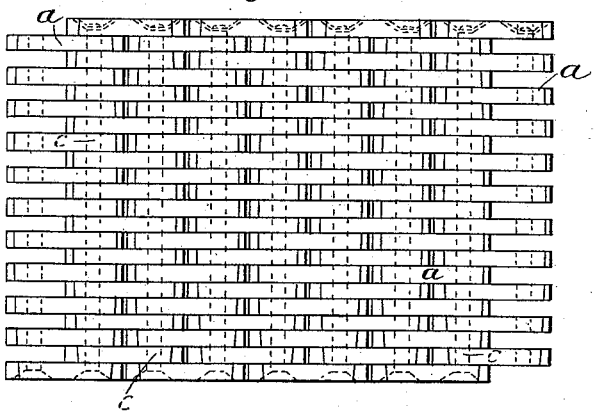
Figure 2:
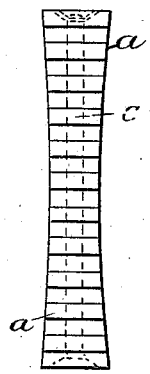
Figure 3:
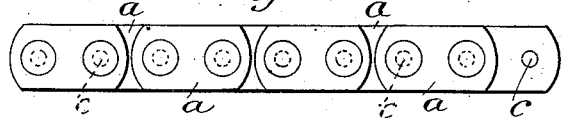

Figure 1 is a plan of a portion of a driving-belt constructed according to my invention. Fig. 2 is an end view. Fig. 3 is a side view of the same.

The belt is formed of series of links $a$, and the adjacent series are yieldingly riveted together by rivets $c$, in the usual manner. The links $a$, forming each series, are of a depth gradually increasing from the center of the belt to the sides thereof, whereby a laterally-concaved bearing-surface is formed which will correspond to pulleys formed with convexed peripheries, and will thus be afforded a close contact with said pulleys.

Although I greatly prefer to form the belt with two concaved bearing-surfaces, as shown clearly in Fig. 2, it will be understood that it may be formed with only one of its surfaces so concaved without departing from the spirit of my invention.

I claim—

1. The herein-described belt, composed of yieldingly-connected links and formed with a concaved bearing-surface, substantially as set forth.

2. A driving-belt formed of series of links yieldingly riveted together, the links of each series gradually increasing in depth from the center to the sides, substantially as shown and described.

JOHN KEIL TULLIS.

Witnesses:
DAVID DRYSDALE AUSTIN,
JOHN GEORGE CLARK.